Dec. 25, 1951  F. MORGAN ET AL  2,580,182
SUBSURFACE FLOWMETER
Filed May 1, 1947  3 Sheets-Sheet 2
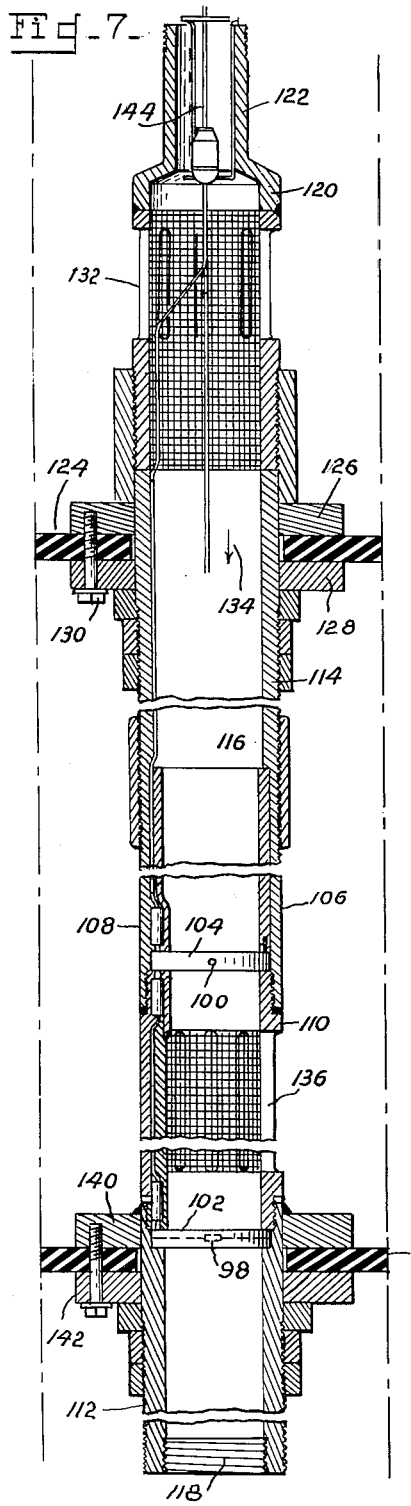
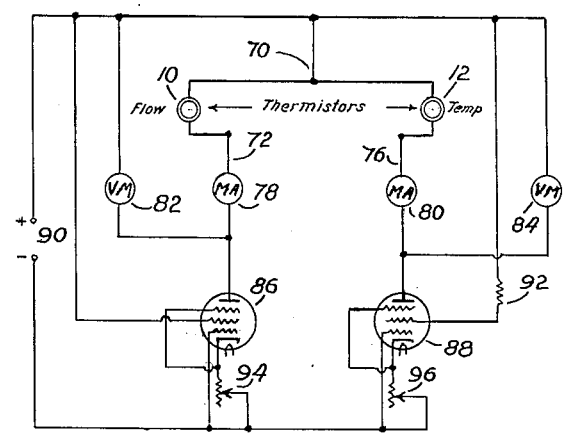
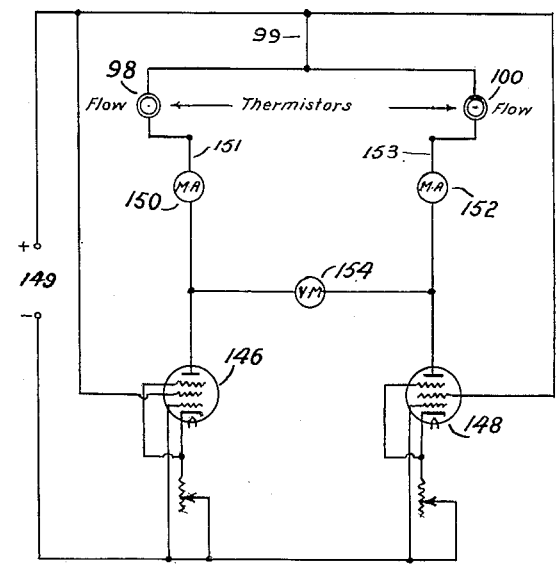
INVENTORS
Frank Morgan
Denzel W. Reed
Morris Muskat
ATTORNEY Dec. 25, 1951  F. MORGAN ET AL  2,580,182
SUBSURFACE FLOWMETER
Filed May 1, 1947  3 Sheets-Sheet 3
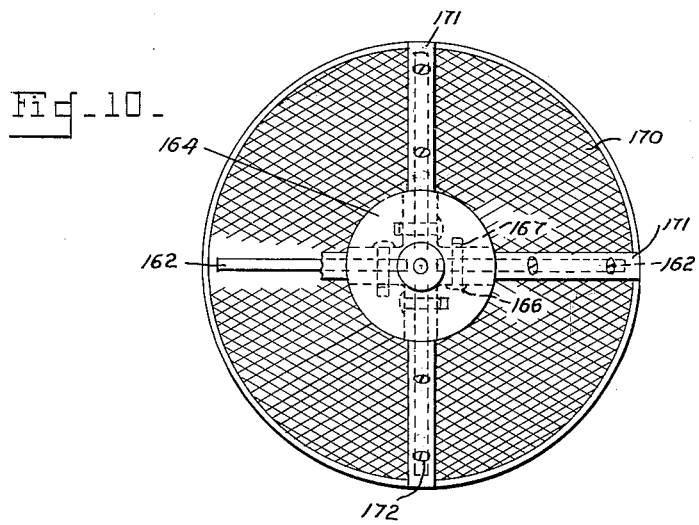
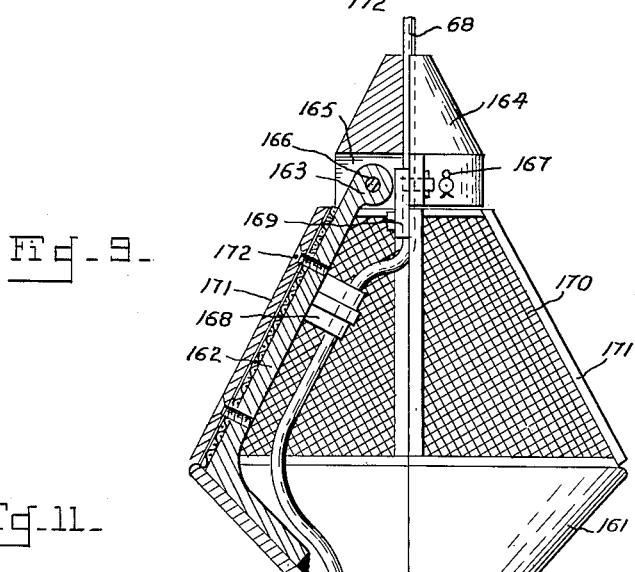
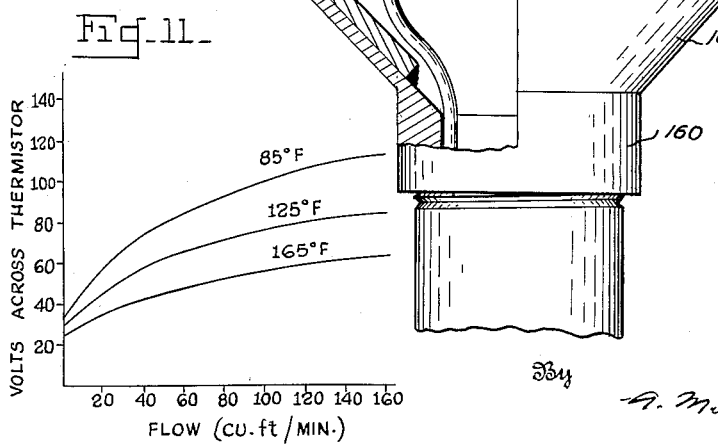
Inventors
Frank Morgan
Denzel W. Reed
Morris Muskat
By
Attorney Patented Dec. 25, 1951

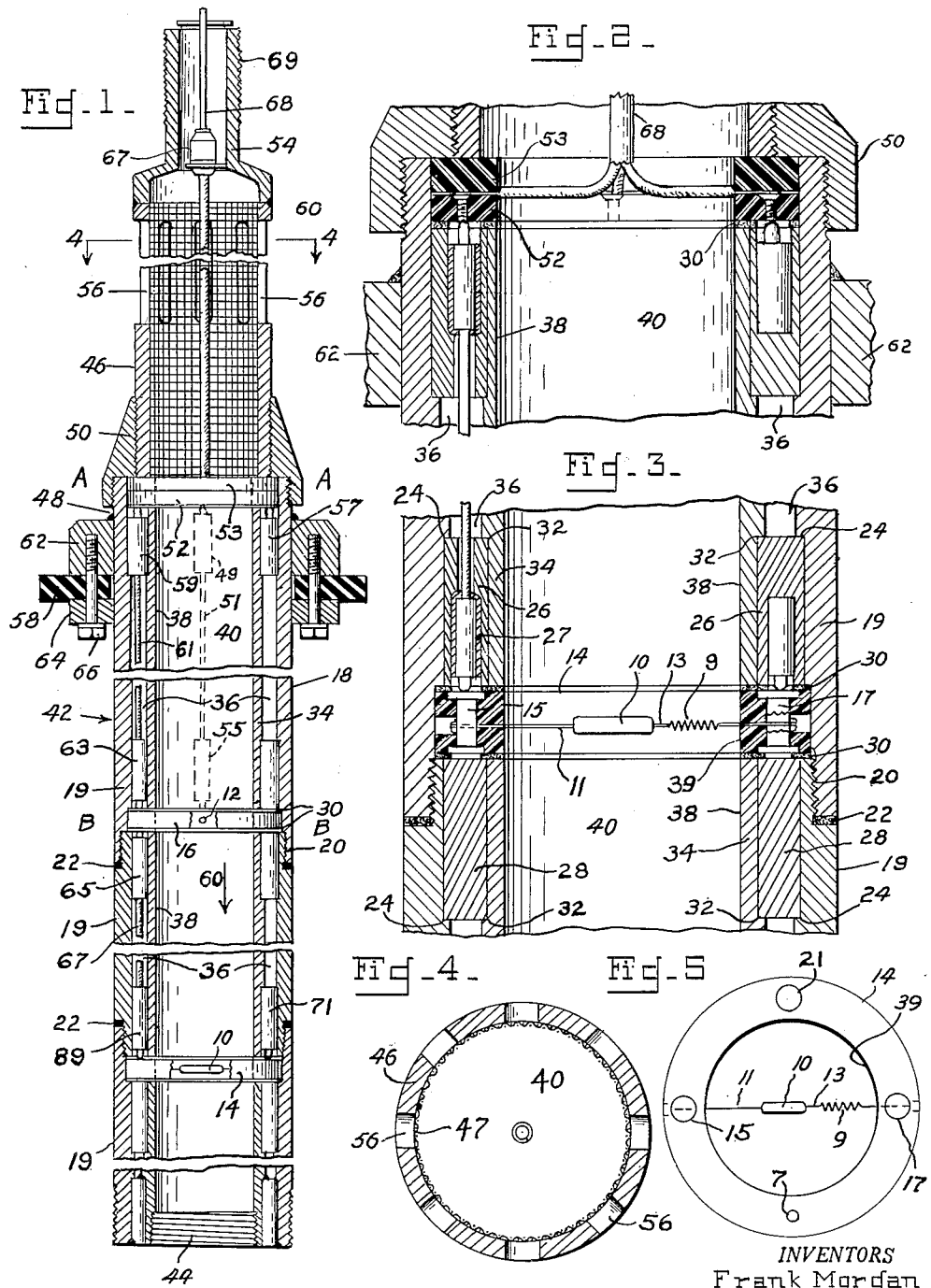

2,580,182

UNITED STATES PATENT OFFICE 2,580,182

SUBSURFACE FLOWMETER

Frank Morgan, Fox Chapel, Denzel W. Reed, Penn Township, Allegheny County, and Morris Muskat, Oakmont, Pa., assignors to Gulf Research & Development Company, Pittsburgh, Pa., a corporation of Delaware Application May 1, 1947, Serial No. 745,330

8 Claims. (Cl. 73—154)

This invention relates to apparatus for the measurement of fluid flow, particularly the measurement of fluid flow in wells.

It is often desirable for the operator of a gas or oil producing well to know the rate at which fluid is flowing from different levels or zones in the well bore. Similarly, in the event the well is used for pressure maintenance, it is important for the operator to know into which sand or sands the injected fluid is passing. Obviously knowledge of this kind will enable the operator to increase the efficiency of production of the hydrocarbon fluids.

An object of the invention is to provide apparatus for the measurement of the rate of fluid flow through various passages in a well bore, casing, and the like.

Another object of the invention is to provide apparatus for measuring the rate of fluid flow at various depths in a well bore.

A further object of the invention is to provide an apparatus for locating the productive zones in a formation and to determine the rate of flow of fluid from such zones.

Still another object of the invention is to provide an apparatus for locating the zones of entry of fluids in injection wells and to determine the rate of fluid flow into said zones.

Another object of the invention is to provide a fluid flow measuring apparatus including a variable resistance element having a high negative temperature coefficient of electrical resistance, which is adapted to be interposed in the path of the fluid, and including means for measuring the electrical resistance of the resistance element.

A further object of the invention is to provide a fluid flow measuring apparatus including a plurality of variable resistance elements having a high negative temperature coefficient of electrical resistance and adapted to be interposed in the path of the fluid, and including means for regulating the current flowing through said resistance elements, and for measuring their electrical resistance, whereby the rate and characteristics of fluid flow may be measured and recorded.

Still another object of the invention is to provide a fluid flow measuring apparatus employing an electrical resistance element commonly known as a "thermistor" and which is adapted for measurement of low rates of fluid flow with considerable accuracy, and without any substantial obstruction to the flow of the fluid itself.

Other objects and advantages of the invention will become apparent from the following description of a preferred embodiment thereof, as illustrated in the accompanying drawings, and in which, Figure 1 is a longitudinal sectional view of one form of the invention, illustrating a flow measuring device adapted for being lowered into a well for determining the rate and characteristics of flow therein, Figure 2 is an enlarged fragmentary sectional detail of the parts located generally at A of Figure 1, Figure 3 is an enlarged fragmentary sectional detail of the parts located generally at B of Figure 1, Figure 4 is a sectional plan view taken on line 4—4 of Figure 1, Figure 5 is a face view of a "thermistor" element and mounting therefor, which may be employed in the devices of Figures 1 and 7, Figure 6 is a schematic electric wiring diagram showing a current limiting and measuring circuit which may be employed in conjunction with the form of device shown in Figure 1, Figure 7 is a longitudinal sectional view of a modified form of the invention, adapted for being lowered into a well and illustrating a type of meter using two or more flow measuring elements for differential measurement of fluid flow, Figure 8 is a schematic electric wiring diagram showing a form of the current limiting and measuring circuit used with the differential meter of Figure 7, Figure 9 is an elevation, partly in section, of an alternative type of top or bottom which may be used on the apparatus of Figs. 1 or 7, Figure 10 is a top view elevation accompanying the elevation of Fig. 9, and Figure 11 shows typical calibration curves for the flow meter of our invention.

In order to understand clearly the nature of the invention, and the best means for carrying it out, reference may now be had to the drawings, in which like numerals denote similar parts throughout the several views.

Referring to Fig. 1, there is a flow measuring element 10, and a temperature measuring element 12, separated by such a distance that radiation from element 10 has practically no effect on element 12. These elements are mounted in insulated rings 14 and 16 respectively, as shown in Fig. 1.

The elements 10 and 12, consist preferably of a semi-conductor of the type known to the trade as a "varistor" or "thermistor" having the general appearance of a small capsule and disposed in the opening 39 (see Figure 5) in the insulated rings 14 and 16 respectively, as shown in Fig. 1, and in detail in Fig. 5. The "thermistor" 10 has two lead wires 11 and 13 which are connected to the conductive bushings 15 and 17 seated in apertures formed in the rings 14 and 16. It will be seen that a small conductive spring 9 may be interposed in the lead wire 13 to provide a certain amount of resiliency in the "thermistor" mounting. The bushings such as 15 and 17, may extend all the way through the rings 14 and 16 so as to permit contact to be made therethrough, or may extend only to one face surface of the rings, depending upon the arrangement of contacts to be made. Additional metal bushings, such as the one shown at 21 (Fig. 5) may also be provided in the rings. The bushing 21 is used to provide conductive contact through the upper "thermistor" ring 16 for the electrical connection running to the lower "thermistor" ring 14 as will become evident later. A small hole 7 in the rings is provided to engage a pin (not shown) for maintaining proper orientation and to prevent rotation of the ring during assembly in the apparatus. The "thermistor" element 10 is tautly suspended by its lead wires 11 and 13 and spring 9 between small transverse holes in bushings 15 and 17, the outer end of the lead wire being bent over and soldered to the respective bushing as illustrated clearly in Fig. 3, the insulating ring 14 having radial outer openings to permit access to the bushing for soldering the lead wires to the bushings.

The unique property of the "thermistor" which renders it particularly valuable as a flowmeter element, is its high negative temperature coefficient of resistance. Such "thermistors" are well known in the art, several types having been described in various patents, such at 2,373,160; 2,396,196; 2,339,029; and 2,332,596. It will be understood that citation of the above patents is merely by way of reference and is not to be taken as a limitation of the term "thermistor" when used herein, to only those forms described in the patents.

As an example of the properties of "thermistors," at a temperature of 77 degrees Fahrenheit, the resistance of one form of "thermistor" will decrease by approximately 2.4 per cent of its original value for an increase of temperature of one degree Fahrenheit, while platinum will increase in resistance by less than 0.2 per cent for the same temperature change. Since the thermal type of flowmeter depends upon loss of heat in an element due to gas or fluid flow, the "thermistor" thus possesses an advantage over the older metallic type of element. "Thermistors" possess another advantage in this particular application due to their higher specific resistance. At room temperature the resistance of the "thermistor" element mentioned above is approximately 40,000 ohms; at 212 degrees Fahrenheit this resistance decreases to 3,500 ohms, and then to 950 ohms at 300 degrees Fahrenheit. In comparison to these values the resistance of 2,000 feet of cable is entirely negligible, and the problem of recording is thus greatly simplified. All the control apparatus including vacuum tubes, batteries, and other parts, may remain at the surface of the ground while the "thermistor" itself is run in the hole.

Semi-conductors, of which the "thermistor" is an example, have unique resistance characteristics which are made use of in our invention. Ordinary conductors such as metals have an electrical resistance which varies with temperature in a substantially linear fashion, represented by the well-known relation $$R_t = R_0[1 + a(t - t_0)]$$

where $R_0$ is the resistance at the temperature $t_0$, $R_t$ is the resistance at a temperature $t$ and $a$ is the well-known temperature coefficient of resistance which depends on the material. Semiconductors however have a resistance which varies with temperature in a non-linear fashion which may be represented by the relation, $$R_T = R_0 e^{(B/T - B/T_0)}$$

where $R_0$ is the resistance at the temperature $T_0$ (Kelvin), $R$ is the resistance corresponding to the temperature $T$, $e$ is the base of natural logarithms and $B$ is a constant which depends on the semi-conducting material. This relation is known to apply to the semi-conductors such as "thermistors" and in one type of "thermistor" used in our invention the constant $B$ is approximately 4000. It is seen that such semi-conductors are characterized in having a resistance which varies in a highly non-linear manner and also in having a substantial decrease in resistance as the temperature rises.

The above resistance vs. temperature characteristic has been combined in our invention with the cooling effect of the flowing fluid in such a way as to produce a relation of voltage vs. flow which has large slope at low flow rates resulting in high instrument sensitivity at low flow rates. Figure 11 shows typical calibration curves of our invention illustrating this result. The manner of obtaining these curves and their use will be described more fully later, but from Figure 11 it is apparent that the curves rise very rapidly at low values of flow and taper off at high flow rates. This is a particularly desirable feature in surveying wells because the high sensitivity at low flow rates makes possible the detection and measurement of small flows through leaks in casing, porous stringers in open formation, etc. whereas the lower sensitivity in the region of high flow rates results only in reduced ability to detect small differences which are unimportant at high flow rates. Additionally, the change in sensitivity is such as to compress the voltage scale at the high flow rates, thereby providing an extended useful range of the device.

In general, at very low values of current, Ohm's law is obeyed by "thermistors." At higher current values the voltage across the "thermistor" reaches a maximum and then decreases. Beyond this maximum point the "thermistor" acts as a negative resistance, that is, as the current increases the voltage drop across the element decreases. At still higher values of the current, usually beyond the safe working range, the slope of the voltage-current curves may again become positive.

While the property of negative resistance is of great value in many applications, it is apparent that the interpretation of results is often complicated or impossible when several values of current may correspond to a single voltage. Furthermore, trouble may be encountered in properly selecting a voltage such that a current range capable of measurement will obtain for the large flow variations that may be found in a given well.

In order to avoid these undesirable qualities of a constant voltage, the flowmeter here described has been designed to operate at essentially a constant current, pentode type vacuum tubes with cathode bias being used as current stabilizers.

Referring again to Fig. 1, it will be seen that the element rings 14 and 16 are mounted in a suitable protecting tube 18, which is open in a longitudinal direction as much as possible, so as to offer a minimum of impedance to fluid flow therethrough along its axis.

The tube 18 is formed of several lengths or sections 19, threadedly joined together as at 20 (see Fig. 3 for details), the joints being sealed by means of packing rings 22 or other suitable material. The tube sections 19 may be recessed at their ends as at 24 to receive annular bushings such as those shown at 26 and 28 in Fig. 3, for supporting the insulating rings 14 therebetween, a tight seal being effected in any suitable manner as by packing rings 30 to prevent fluid from reaching electrical connections. The packing rings 30 have holes opposite the bushings 15, 17, 21, so that contact may be made to these, and rings 30 also have a hole opposite 7 for engaging a pin to prevent turning in assembly.

The bushings 26 and 28 are also lodged in annular recesses 32 formed in the ends of inner tube sections 34 which are spaced from the outer tube 18 so as to form an annular passageway 36 therebetween. The axially aligned inner bores 38 of the inner tube sections and the intervening axial bores 39 of the rings 14 thus form a tubular passageway 40 extending axially through the length of the main body portion 42 of the device shown in Fig. 1, the lower end 44 of which forms a discharge opening.

The bushings 26 and 28 carry spring contactors, examples of which are shown in Fig. 3. These contactors are of conventional type, and may be enclosed in an insulating sleeve as shown at 27 in Fig. 3. Certain of these spring connectors serve to make connections to ground, i. e. to the case of the apparatus, in which case the insulating sleeve 27 is omitted and the metal shell of the contactor thereby grounds to the annular bushing 26 and the case section 19. The spring contactors are connected in circuit by wires running in the annular space 36. Similar spring contactors are held in annular bushings just above the ring 14 and just below the ring 52 described later.

An upper extension 46 having an axial bore in alignment with bore 40, is secured to the upper end 48 of the main body portion 42, by means of a coupling 50 threaded thereto. The extension 46 is reduced at its upper end 54, and has external threads 69, whereby it may be engaged with pipe stem sections, or a suspension cable clamp, not shown, for being supported. The cable 68 may extend upwards through a stuffing box or so called "lubricator" at the well head.

Two insulating rings 52 and 53 being seated in the upper end of the body 42 and retained therein by the coupling 50 as shown in detail in Fig. 2. The rings 52 and 53 are similar to the insulating rings 14 and 16, but do not have any flow measuring elements such as those shown at 10 and 12 supported therein. The upper ring 53 is a plain insulating ring without metal bushings. The lower ring 52 has metal bushings located similarly to 15, 17 and 21 of the rings 14 and 16.

The three conductor reinforced electric cable 68 may serve both to support the apparatus when lowered into a well and also to make electrical connection to the "thermistor" elements 10 and 12 in the apparatus. The cable 68 enters through a conventional cable clamp (not shown) which engages threads 69 at the top of the apparatus, then engages a waterproof separable connector 67. The lower end of the cable 68 is stripped of its outer jacket and the three individual conductors each retaining its own insulation, are fanned out and each conductor soldered to its respective one of the three bushings in the ring 52. One of the conductors will be grounded as explained later and may comprise the cable reinforcing.

Connections are made from the cable 68 to the "thermistor" elements 10 and 12 as follows. Referring to Fig. 1, one of the conductors from cable 68 is contacted by spring connector 49 held in an annular ring similar to rings 26 and 28 referred to in Fig. 3. The connector 49 is connected by wire 51 to a similar spring connector 55 in the ring 26. Contact is thus made to bushing 17 of ring 16 and to the "thermistor" 12 mounted therein. The bushing 15 of ring 16 is contacted by a diametrically opposite spring connector (not shown) which is grounded to the case of the apparatus.

A second conductor from cable 68 goes to a bushing in ring 52 and is contacted by spring contactor 57 which is grounded to the case of the apparatus. Thus a completed circuit is established through "thermistor" 12 two conductors of cable 68, one of which is grounded to the case of the apparatus.

The third conductor from cable 68 goes to the third bushing in ring 52 and is contacted by spring connector 59. Connection then goes via wire 61 to spring connector 63 in ring 26. Spring connector 63 contacts the upper side of bushing 21 in ring 16, and bushing 21 is contacted on its lower side by spring connector 65. From there the connection goes via wire 67 to spring connector 89 which contacts the bushing 15 in ring 14, and thus connects with the "thermistor" 10 mounted therein. The bushing 17 is connected to ground by grounded spring connector 71, thus completing the circuit through "thermistor" 10.

The flow elements 10 and 12 through contact with their conductive bushings 15 and 17, are thus connected electrically through the body 42 of the meter and cable 68 which goes upwards through the well to the surface of the ground, and is connected there to a current limiting and measuring circuit of suitable design, one form of which is shown in Figure 6. As seen in that figure, the flow measuring element 10 is thus connected across terminals 70 and 72, and the temperature measuring element 12 is connected across the terminals 70 and 76, the common connection 70 being the grounded conductor of the cable.

The circuit of Fig. 6 is so arranged that two essentially constant currents are supplied to elements 10 and 12. Element 12 has a small enough current passed through it so that there is substantially no heating effect of the element. Consequently, fluid flowing by this element causes a resistance change only because of an ambient temperature change.

The flow element 10 has a much higher current passed through it, and consequently is heated to much higher than ambient temperature. Fluid flowing in the meter causes a cooling of this element, and thus its resistance and the voltage across it increase for a constant current.

The currents through the elements 10 and 12 are shown in milliammeters 78 and 80 respectively, while the voltages across the elements are exhibited by voltmeters 82 and 84. As will be understood by those skilled in the art, the circuit illustrated in Fig. 6 includes a pair of multi-element electron tubes 86 and 88 having indirectly heated cathodes, and having plate voltage connected at 90, the resultant plate currents for each tube flowing through the flow and temperature measuring elements 10 and 12 which are interposed in their respective plate circuits.

As an example, which is illustrative only and not to be taken in a limiting sense, the plate voltage supply 90 may be on the order of 250 volts, and the fixed resistor 92 on the order of 200,000 ohms, the variable rheostats 94 and 96 having maximum values on the order of 1000 and 70,000 ohms respectively.

The voltage changes of both elements 10 and 12 are thus shown on the measuring part of the current-limiting circuit, as well as on a recording voltmeter which may be connected in the circuit.

When the apparatus is used in the manner described various rates of flow past the element 10 of the apparatus of Figure 1 give rise to corresponding readings of voltmeter 82 of Figure 6. Calibration data may be obtained by reading the voltmeter 82 at various flow rates taken at constant temperature throughout the range of flow to be encountered and from such data a curve relating the indication of meter 82 to the actual flow may then be drawn. Since the cooling effect of the flow on the element 10 will depend on the temperature of the flowing fluid, a different curve is obtained for different temperatures and a family of such calibration curves may be plotted as illustrated in Figure 11. Such calibration tests may be made in the laboratory by blowing known quantities of gas of known temperature through the apparatus and observing the indications of meter 82. Alternatively, a satisfactory and simpler calibration may be made with the apparatus in the well just prior to its use in a manner to be described later. The result of such calibration data is that thereafter one may infer the flow passing through the apparatus of Figure 1 in the well by observing the indication of meters 82 and 84 of Figure 6 at the surface of the ground. Thus the reading of the temperature-indicating meter 84 (previously calibrated as explained below) determines which one of the curves of Figure 11 applies, and from the reading of the flow-indicating meter 82 as entered on this particular curve one may determine the flow through the apparatus directly in cubic feet per minute.

Similarly the element 12 may be calibrated for various temperatures by passing gas of known temperatures through the apparatus of Figure 1 and observing the indication of meter 84 of Figure 6. Since there is little or no heating of element 12, the indication of meter 84 is substantially independent of flow rate. From such calibration data a curve (not shown) may be drawn relating the temperature of the gas flowing through the apparatus to the indication of meter 84 and subsequently from this curve the temperature of flow encountered in the well may be inferred from the indication of meter 84 at the surface of the ground.

Calibration of the form of the apparatus illustrated in Figures 7 and 8 is similarly carried out with certain modifications to be described later.

In one form of the apparatus shown in Fig. 1, fluid flowing into the well bore is directed into the bore 40 through slots 56 formed in the wall of extension 46 (see also Fig. 4), which may be covered by wire mesh 47 to block entry of debris and solid matter. Flow of fluid through the apparatus is accomplished by the use of a rubber packer ring 58 (Fig. 1) the outer diameter of which is slightly larger than the casing or open hole forming the well bore, in which the apparatus is being used. The fluid enters through the slots 56, passes along bore 40 through the entire length of the apparatus, and out through discharge opening 44 into the well bore, the direction of flow being indicated generally, for example, by the arrow 60. It will be seen that the packer ring 58 may be secured in position between two annular bushings 62 and 64, one of which is welded to the tube 18, and which are secured together with the packer ring therebetween, by means of screws 66.

In another form of the invention shown in Fig. 1, the packer ring 58 may be eliminated from the body 42 of the apparatus. Less fluid then goes through the apparatus bore 40, and the sensitivity is decreased. To use the apparatus in this form, it is desirable to take caliper logs of the well being measured, so that corrections can be made for the variations in sensitivity caused by variations in hole diameter.

In using the apparatus of Fig. 1 without the packer ring 58, the top of the apparatus should be left open as far as possible to permit unrestricted axial flow of fluid through the bore 40. To facilitate the entrance of fluid into the apparatus a funnel attachment such as is shown in Figs. 9 and 10 may be used, although this is not necessary. A funnel attachment similar to that of Figs. 9 and 10 may also be used on the bottom end of the apparatus should such be found desirable.

In using the attachment shown in Figs. 9 and 10 the parts 66, 64, 58, 62, 50, 46 of Fig. 1 are omitted or removed and the part 50 replaced by an internally threaded section 160 having a funnel shaped upper portion 161. The part 160 may be screwed on to the upper portion 48 of the apparatus of Fig. 1. To the inside of the flaring portion 161 there are welded four narrow angle pieces 162 their upper ends approaching relatively close to each other, and each angle piece having at its upper end an eye 163. The four eyes are attached to a conical head piece 164 having a central hole for the cable 68 and having in its base four narrow slots 165 into which the four eyes 163 of the four angle pieces fit. Through the conical head piece 164 and each eye 163 there is a pin 166 each of which is held in place with a cotter pin 167. A separable waterproof cable connector 168 is attached to one of the angle pieces 132 by means of a bracket. A cable clamp 169 may be incorporated as part of the conical head piece 164, or the cable may have a clamp below the piece 164, said clamp (not shown) taking the tension strain against the bottom face of 164. The open space between the narrow angle pieces 162 may be covered with screening 170 held in place by strips 171 and screws 172 into the angles 162 as indicated. The arrangement of Figs. 9 and 10 permits relatively unrestricted flow of fluid through the apparatus and at the same time serves to keep out dirt or solid matter.

Figure 7 shows a form of the apparatus which may be used for differential flow measurements. As shown, 98 and 100 are the flow measuring elements mounted in insulating rings 102 and 104, the elements and insulating rings being similar to those shown in Figs. 1 and 5 and already described. Both the elements 98 and 100 are used to measure flow in this form of the apparatus, and are separated by the distance apart of the required differential measurement.

The elements 98 and 100 are mounted in a hollow tubular housing generally indicated at 106, formed of a number of intercoupled tubular sections such as those shown at 108, 110, 112 and 114, the housing 106 having an axial bore 116 extending therethrough with a discharge outlet 118 at its lower end. The upper end section 120 is reduced at its upper end 122 which is threaded externally to permit coupling to pipe stem sections (not shown) if desired or to a cable clamp for supporting the apparatus for raising and lowering it in a well bore.

Fluid flow in the bore hole may be diverted through the apparatus by use of the packing ring 124 which is slightly greater in diameter than the well bore, and is held in position between annular bushings 126 and 128 which are secured together by screws 130. The fluid enters through openings 132, flowing, for example, in the general direction of the arrow 134, through bore 116.

Fluid flow across element 100 causes a resistance change in that element, and consequently a change in the voltage drop across it, in the same manner as explained in connection with Fig. 1, but, if the apparatus of Fig. 7 is in a permeable section of the formation the fluid can escape through slots 136 formed in the housing 106 and into the sand. The remaining fluid continues through the bore 116 across element 98 and then out through discharge outlet 118.

The fluid that has escaped through slots 136 must go into the formation because the path outside the apparatus is restricted by a second packer ring 138 similar in size and construction to packer ring 124 but located beyond the slots 136, and held in position between bushings 140 and 142. The remaining fluid that continues through the apparatus and past element 98 has less velocity and therefore the effect on element 98 is less than the full flow on element 100.

The elements 98 and 100 are connected electrically through the body of the apparatus housing 106 and cable 144 to the surface, and into a suitable circuit such as is shown in Fig. 8. Electrical connection inside the apparatus housing 106 and leading to the "thermistor" elements 98 and 100 are indicated diagrammatically in Fig. 7 and the details of such connections inside the apparatus may be similar to those described in connection with Fig. 1 already described. The leads 99, 151 and 153 (Fig. 8) are the conductors in the cable 144, lead 99 being the grounded conductor.

The circuit of Fig. 8 is so arranged that the "thermistor" elements 98 and 100 are inserted in the plate circuits of multiple element thermionic tubes 146 and 148, which are supplied with high voltage from a source connected at 149. The plate currents in both tubes are held constant and preferably equal to each other, the currents being shown on milliammeters 150 and 152. The voltage differential, if any, is read on voltmeter 154 bridged across the two tube plates, and may be recorded on a continuous recorder, not shown, if desired.

The differential form of the apparatus shown in Fig. 7 may also be used without the packers 124 and 138. If desired on omission of the packers the apparatus may be equipped with top and bottom funnel shaped outlets similar to that shown in Figs. 9 and 10.

The following instructions may serve to outline the calibration procedure when such is to be carried out in a well, for example, a gas-injection well, instead of in the laboratory. An advantage results when the calibration is carried out in the particular well in which the apparatus is to be used in that the temperature has been found to remain substantially constant at the calibration value, thus eliminating the need for observing the temperature-indicating meter 84 of Figure 6, and in fact when the apparatus is to be so calibrated the temperature element 12 of Figure 1 and its connected electrical equipment on the right-hand side of Figure 6 may be dispensed with entirely thus further simplifying the construction of the apparatus. Also when such a calibration is made in the particular well to be tested the calibration curve (see Figure 11) becomes but one curve instead of a family of curves thus simplifying the computation of the actual flow encountered.

The general procedure used in calibrating the flow meter is to lower it into the well to a point 5 or 10 feet above the casing seat and vary the flow into the well. For each calibration point the flow is held essentially constant until equilibrium has been established. This procedure is suitable for the apparatus of Fig. 1 because the variation in flow is measured across one "thermistor," namely by means of the meter shown as 82 in Fig. 6. When the differential form of apparatus, Fig. 7, is used in the casing as above, the flow across both "thermistors" is the same because no fluid can escape through slots 136 (assuming diaphragm packers are used). Since the voltage measured in the differential form of apparatus as shown in Fig. 8 is the difference in the voltage drops across the "thermistors," no voltage difference will be observed on meter 154 for equal flows through the two "thermistors." This will hold because the "thermistors" will have identical characteristics for the same conditions of flow and temperature. To obtain a calibration of the differential form of the apparatus, it is necessary to cut one "thermistor" out of the circuit. This is readily accomplished by removing either tube 146 or 148, Fig. 8, and connecting voltmeter 154 across the appropriate "thermistor," 98 or 100, through which current flows. The calibration is then carried out on one "thermistor" in the same manner as for the apparatus of Fig. 1. Since the "thermistors" are selected so as to have identical characteristics, the above described calibration of one element is all that is necessary to calibrate the differential form of the apparatus. In the differential form, one "thermistor" element may serve as a temperature indicator by employing the circuit of Fig. 6. This is useful to determine the temperature at which a calibration is made.

If the diaphragm packers are omitted from the apparatus the same calibration procedure may be used. However in this case the apparatus tends to become a velocity meter, and its absolute flow calibration depends on the diameter of the hole or pipe in which it is suspended. Small local variations in hole diameter have little effect on the calibration. Large variations due to caving of formation wall, etc. will affect the calibration when no packers are used, and will also affect the reading if packers are used which are too small in diameter to completely bridge the enlarged hole.

It will be seen that this invention describes apparatus which has extreme sensitivity for measuring fluid flow. This device can easily measure fluid flow on the order of as little as 500 cubic feet of gas per day. Hot wire anemometers as heretofore constructed, generally have low sensitivity for high flow rates. However, the present invention permits operation at constant current and at variable voltage drop across the thermistor elements. A convenient temperature at which the "thermistor" may be operated is about 160 degrees centigrade above ambient. In actual use, no fluid flows have yet been encountered the magnitude of which is great enough to produce a low order of sensitivity.

Although we have described preferred forms of our invention in specific terms, it is to be understood that various changes may be made in size, shape, materials and arrangement without departing from the scope and spirit of the invention as claimed herein.

The calibrating procedure described herein is by way of example only and our apparatus may also be calibrated by passing known quantities of fluid through it at the surface of the well or in the laboratory.

We claim:

1. A flow meter comprising a housing adapted for being lowered into a well and having a passageway extending longitudinally therethrough, means carried by said housing to induce well fluid to flow through said passageway, semi-conductor means disposed in the said passageway in the path of said fluid and having the characteristic that its electrical resistance decreases in a non-linear manner with increase in operating temperature, means electrically connected to said semi-conductor means for maintaining a constant electric current flowing through said semi-conductor means, and indicating means electrically connected to said semi-conductor means responsive to variations in electrical resistance thereof, whereby the characteristics of said fluid flow may be determined.

2. A flow meter comprising a housing adapted for being lowered into a well and having a passageway extending longitudinally therethrough, means carried by said housing restricting passage of fluid outside said housing, such fluid being free to flow through said passageway, semi-conductor means disposed in the path of said fluid and having the characteristic that its electrical resistance decreases in a non-linear manner with increase in operating temperature, an electron discharge tube, said semi-conductor means being connected to the anode of said tube, a circuit including said tube and semi-conductor means and so arranged as to maintain the electric current flowing through said semi-conductor means at a constant value, and indicating means electrically connected to said semi-conductor means responsive to variations in electrical resistance thereof.

3. A flow meter comprising a housing adapted for being lowered into a well and having a passageway extending longitudinally therethrough, a packer ring carried by said housing and extending outward therefrom to block passage of fluid between the housing and the well wall, such fluid being free to flow through said passageway, semi-conductor means disposed in the path of said fluid and having the characteristic that its electrical resistance decreases in a non-linear manner with increase in operating temperature, an electron discharge tube, said semi-conductor means being connected to the anode of said tube, a circuit including said tube and semi-conductor means and so arranged as to maintain the electric current flowing through said semi-conductor means at a constant value, and indicating means electrically connected to said semi-conductor means responsive to variations in electrical resistance thereof.

4. A flow meter comprising an elongated hollow tubular housing closed at its upper end and having an open lower end, said housing having fluid inlet means formed adjacent its upper end through which fluid is free to enter the housing and flow therethrough to be discharged through its open lower end, a first "thermistor" element supported in said housing in the path of said fluid, a second "thermistor" element supported in said housing in the path of said fluid and spaced from said first "thermistor" element, said "thermistor" elements being so constructed and arranged as to provide a minimum of obstruction to the fluid flow therepast, an electronic circuit in which said "thermistor" elements are connected and including electron discharge means for providing stabilized currents flowing through said "thermistors," and indicating means electrically connected to said "thermistors" responsive to variations in voltage drop across said "thermistors."

5. A flow meter comprising an elongated hollow tubular housing closed at its upper end and having an open lower end, packing means carried by said housing intermediate its ends and extending outward therefrom to block passage of fluid between the housing and the well wall, said housing having fluid inlet means formed adjacent its upper end through which fluid is free to enter the housing and flow therethrough to be discharged through its open lower end, a first "thermistor" element supported in said housing in the path of said fluid, a second "thermistor" element supported in said housing in the path of said fluid and spaced from said first "thermistor" element, said "thermistor" elements being so constructed and arranged as to provide a minimum of obstruction to the fluid flow therepast, an electronic circuit in which said "thermistor" elements are connected and including electron discharge means for providing stabilized currents flowing through said "thermistors," and indicating means electrically connected to said "thermistors" responsive to variations in voltage drop across said "thermistors."

6. A differential flow meter comprising a housing adapted for being lowered into a well, and having a passageway extending therethrough, well fluid being free to flow through said housing passageway, a first flow measuring "thermistor" element supported in said passageway in the path of said fluid flow, a second flow measuring "thermistor" element supported in said passageway nearer its discharge end and spaced from said first element, said housing having an intermediate opening formed in its walls between said first and second flow measuring elements, means electrically connected to said "thermistor" elements for causing constant current to flow through each of said "thermistor" elements, and indicating means electrically connected to said "thermistor" elements responsive to the voltage drop differential between said "thermistor" elements, whereby characteristics of fluid flow in said well can be determined.

7. A differential flow meter comprising a housing adapted for being lowered into a well, and having a passageway extending therethrough, first packing means carried by said housing near its upper end and extending outwardly from the housing to block passage of fluid between the housing and the well wall, said fluid being free to flow through said housing passageway, a first flow measuring "thermistor" element supported in said passageway in the path of said fluid flow, a second flow measuring "thermistor" element supported in said passageway nearer its discharge end and spaced from said first element, said housing having an intermediate opening formed in its walls between said first and second flow measuring elements, second packing means carried by said housing between said intermediate opening and lower discharge opening of said passageway to block the flow of fluid between the adjacent portion of the housing and the well wall, means electrically connected to said "thermistor" elements for causing constant current to flow through each of said "thermistor" elements, and indicating means electrically connected to said "thermistor" elements responsive to the voltage drop differential between said "thermistor" elements, whereby characteristics of fluid flow in said well can be determined.

8. A differential flow meter comprising a housing adapted for being lowered into a well, and having a passageway extending therethrough, well fluid being free to flow through said housing passageway, a first "thermistor" element supported in said passageway in the path of said fluid flow, a second "thermistor" element supported in said passageway nearer its discharge end and spaced from said first element, said housing having an intermediate opening formed in its walls between said first and second "thermistor" elements, a pair of electron discharge tubes whose anodes are respectively connected to said "thermistor" elements, an electric circuit including said tubes and said "thermistor" elements and adapted to maintain the electric current flowing through each of said "thermistor" elements at a constant value, and voltage-indicating means electrically interconnecting said "thermistor" elements responsive to variations in the difference between between the voltage drops across said "thermistor" elements.

FRANK MORGAN.
DENZEL W. REED.
MORRIS MUSKAT.

REFERENCES CITED

The following references are of record in the file of this patent:

UNITED STATES PATENTS

| Number | Name | Date |
| --- | --- | --- |
| 853,492 | Beck | May 14, 1907 |
| 1,156,630 | Savage | Oct. 12, 1915 |
| 1,265,775 | Hadaway | May 14, 1918 |
| 1,440,778 | Foster | Jan. 2, 1923 |
| 1,652,472 | Erwin et al. | Dec. 13, 1927 |
| 2,175,890 | Glowatzki | Oct. 10, 1939 |
| 2,352,056 | Wilson | June 20, 1944 |
| 2,375,273 | Black | May 8, 1945 |
| 2,379,138 | Fitting, Jr., et al. | June 26, 1945 |
| 2,421,759 | Pearson | June 10, 1947 |